(12) United States Patent
Aleksandrov

(10) Patent No.: US 11,682,008 B2
(45) Date of Patent: Jun. 20, 2023

(54) METHOD OF AUTHENTICATING A CUSTOMER, METHOD OF CARRYING OUT A PAYMENT TRANSACTION AND PAYMENT SYSTEM IMPLEMENTING THE SPECIFIED METHODS

(71) Applicant: Vadim Nikolaevich Aleksandrov, Moscow (RU)

(72) Inventor: Vadim Nikolaevich Aleksandrov, Moscow (RU)

(*) Notice: Subject to any disclaimer, the term of this patent is extended or adjusted under 35 U.S.C. 154(b) by 177 days.

(21) Appl. No.: 17/034,001

(22) Filed: Sep. 28, 2020

(65) Prior Publication Data
US 2022/0101286 A1    Mar. 31, 2022

(51) Int. Cl.
*G06Q 20/38* (2012.01)
*G06Q 20/10* (2012.01)
*G06Q 20/32* (2012.01)
*G06Q 20/34* (2012.01)
*G06Q 20/40* (2012.01)
(Continued)

(52) U.S. Cl.
CPC ....... *G06Q 20/3829* (2013.01); *G06F 21/602* (2013.01); *G06Q 20/108* (2013.01); *G06Q 20/3223* (2013.01); *G06Q 20/3278* (2013.01); *G06Q 20/341* (2013.01); *G06Q 20/385* (2013.01); *G06Q 20/3825* (2013.01); *G06Q 20/3827* (2013.01); *G06Q 20/38215* (2013.01); *G06Q 20/40145* (2013.01); *G06Q 30/0185* (2013.01); *G06Q 40/02* (2013.01); *H04L 9/0825* (2013.01); *H04L 9/3228* (2013.01); *H04L 9/3231* (2013.01); *H04L 9/3242* (2013.01);
(Continued)

(58) Field of Classification Search
None
See application file for complete search history.

(56) References Cited

U.S. PATENT DOCUMENTS 4,423,287 A * 12/1983 Zeidler ................. G07F 7/1016
                                                      380/45
4,578,530 A *  3/1986 Zeidler ................. G06Q 20/027
                                                      705/79
(Continued)

OTHER PUBLICATIONS

Jayasinghe et al (Enhancing EMV Online PIN Verification) (Year: 2015).*
(Continued)

*Primary Examiner* — Mamon Obeid

(57) ABSTRACT

The invention relates to the field of technical infrastructures that ensure the implementation of financial transactions between economic entities, in particular to payment systems that provide ease of use and confidential data security.

The present invention is the method of authenticating a customer, the method of carrying out a payment transaction comprising said authentication method, and the payment system implementing the specified methods, which ensure the achievement of a technical effect consisting in expanding the functionality of the payment system and reducing its vulnerability, in particular, by making it possible to conduct a payment transaction in a contactless way, on condition that the reference value of the customer authentication data is stored exclusively on the customer's device, as well as by combining the advantages of online and offline customer authentication procedures.

26 Claims, 5 Drawing Sheets

(51) Int. Cl.
*G06Q 40/02* (2023.01)
*G06F 21/60* (2013.01)
*H04L 9/32* (2006.01)
*H04L 9/08* (2006.01)
*G06Q 30/018* (2023.01)

(52) U.S. Cl.
CPC ....... *H04L 9/3247* (2013.01); *G06Q 2220/00* (2013.01); *H04L 2209/56* (2013.01)

(56) References Cited

U.S. PATENT DOCUMENTS

| | | | | |
|---|---|---|---|---|
| 5,689,565 | A * | 11/1997 | Spies | G06F 21/602 713/176 |
| 5,790,677 | A * | 8/1998 | Fox | G06Q 30/06 705/75 |
| 7,499,551 | B1 * | 3/2009 | Mire | H04L 9/0822 380/278 |
| 7,658,323 | B2 * | 2/2010 | Kleinman | G07G 1/14 235/375 |
| 7,885,413 | B2 * | 2/2011 | Vasic | H04L 9/3271 380/282 |
| 9,727,862 | B2 * | 8/2017 | O'Connell | G06Q 20/4014 |
| 10,262,505 | B1 * | 4/2019 | Gopalakrishna | G07F 19/2055 |
| 10,373,141 | B1 * | 8/2019 | Kawan | G06Q 20/145 |
| 10,565,587 | B1 * | 2/2020 | Newman | G06Q 20/352 |
| 10,915,902 | B2 * | 2/2021 | Bouda | G06Q 20/4012 |
| 11,068,895 | B2 * | 7/2021 | Kinagi | G06Q 20/4015 |
| 11,538,030 | B2 * | 12/2022 | Murray | G06Q 20/3827 |
| 11,607,875 | B2 * | 3/2023 | Dave | B22F 12/49 |
| 2004/0053642 | A1 * | 3/2004 | Sandberg | H04L 9/3263 455/558 |
| 2005/0144439 | A1 * | 6/2005 | Park | H04L 63/06 713/155 |
| 2005/0250538 | A1 * | 11/2005 | Narasimhan | G07F 7/1025 455/411 |
| 2008/0077798 | A1 * | 3/2008 | Nachtigall | G06F 21/34 713/184 |
| 2009/0161876 | A1 * | 6/2009 | Sherkin | H04L 9/0844 380/278 |
| 2011/0031310 | A1 * | 2/2011 | Wilson | G06Q 20/12 235/380 |
| 2012/0158515 | A1 * | 6/2012 | K. | G06Q 30/0269 705/14.66 |
| 2013/0282589 | A1 * | 10/2013 | Shoup | G06F 21/34 726/5 |
| 2014/0344166 | A1 * | 11/2014 | Maddocks | H04W 12/37 705/72 |
| 2015/0019442 | A1 * | 1/2015 | Hird | H04W 12/041 726/30 |
| 2015/0046340 | A1 * | 2/2015 | Dimmick | G06Q 20/384 705/72 |
| 2015/0154595 | A1 * | 6/2015 | Collinge | H04L 63/0428 705/71 |
| 2015/0156176 | A1 * | 6/2015 | Collinge | H04W 12/041 713/168 |
| 2016/0110703 | A1 * | 4/2016 | Herring | G07G 1/0045 705/23 |
| 2016/0162883 | A1 * | 6/2016 | Liscia | G06Q 20/3278 705/71 |
| 2017/0244692 | A1 * | 8/2017 | Bhupathiraju | H04L 63/083 |
| 2018/0007052 | A1 * | 1/2018 | Quentin | G06Q 20/42 |
| 2018/0025332 | A1 * | 1/2018 | Huang | G06Q 20/10 705/71 |
| 2018/0123785 | A1 * | 5/2018 | Chen | H04L 9/0869 |
| 2018/0232817 | A1 * | 8/2018 | Isaacson | G06F 3/048 |
| 2018/0278589 | A1 * | 9/2018 | Bhandari | G06Q 20/4012 |
| 2020/0167775 | A1 * | 5/2020 | Reese | G06Q 20/4014 |
| 2021/0166215 | A1 * | 6/2021 | Aleksandrov | H04L 9/0643 |
| 2021/0241264 | A1 * | 8/2021 | Wong | G06Q 20/3278 |
| 2022/0012974 | A1 * | 1/2022 | Osborn | G06F 21/35 |
| 2022/0101286 | A1 * | 3/2022 | Aleksandrov | H04L 9/3231 |
| 2022/0207940 | A1 * | 6/2022 | Parthasarathi | H04W 4/021 |

OTHER PUBLICATIONS

Madhoun (An Online Security Protocol for NFC Payment) (Year: 2016).*

El Madhoun et al (An Online Security Protocol for NFC Payment) (Year: 2016).*

* cited by examiner

METHOD OF AUTHENTICATING A CUSTOMER, METHOD OF CARRYING OUT A PAYMENT TRANSACTION AND PAYMENT SYSTEM IMPLEMENTING THE SPECIFIED METHODS

FIELD OF THE INVENTION

The invention relates to the field of technical infrastructures that ensure the implementation of financial transactions between economic entities, in particular to payment systems that provide ease of use and confidential data security.

BACKGROUND OF THE INVENTION

As is known, in order to carry out a secure payment transaction, it is necessary to authenticate the customer and to authenticate the customer's payment device. The development of information technology has allowed the transition from passive customer payment devices (namely, bank cards with a magnetic stripe), performing the function of information carriers only, to active devices that can not only serve as information carriers, but also perform computational operations (for example, bank cards with chips or smart cards). With the expanding use of the latter, the authentication operations of the customer and of the customer's payment device have undergone significant changes, in particular, it has become possible to use variable data that changes with each transaction, in turn making it possible to significantly increase the resistance of payment systems to so-called replay attacks (i.e., attacks in which a valid data transmission is maliciously intercepted and fraudulently repeated or replayed). In addition, it is now possible to authenticate customers and their devices in two modes: offline and online.

The authentication of a customer often consists of comparing two values of authentication data: a reference value and the one inputted by the customer. In this case, authentication data, in general, are divided into 3 factors: something that the customer knows (for example, a password or a PIN-code); something that the customer possesses (for example, a data file or a key); something that is an integral part of the customer (for example, his/her biometric characteristics).

With regard to the authentication of the customer, the main difference between the aforementioned modes (offline and online), is which of the system's information nodes stores the reference value of the authentication data and which of the nodes performs the operation of comparing the values of the authentication data.

In the offline mode, the reference value of the authentication data is stored on the customer's device, such as the bank card with a chip. During a payment transaction, the customer inserts a card into the terminal, the terminal prompts the customer to input an authentication data value (for example, enter a PIN code), the customer inputs an authentication data value, the terminal transits it to the customer's card and the card compares the two authentication data values: the reference value stored on the card, and the value inputted by the customer. The matching (correspondence) of the two values confirms the identity of the customer, and thus it is the positive result of customer authentication. This authentication mode is "offline" because throughout the entire process, it is not necessary for the terminal to contact the server of the customer's bank.

In contrast, in the online mode, the reference value of the authentication data is stored remotely—on the customer's bank server. In this way, the value of the authentication data inputted by the customer is transmitted by the payment terminal onto the server of the bank, where the authenticating comparison operation takes place. The authentication result is then transmitted back by the bank server to the payment terminal.

In both modes, due to the need to transmit confidential information between nodes, the use of various encryption algorithms is widespread in order to ensure a sufficient level of security.

The above mechanisms are standardized by the international standard for operations with bank cards having an EMV chip (Europay+MasterCard+VISA).

At present, due to the rapid development of information technologies, the use of contactless payment methods has become widespread, wherein the data transfer between the customer's device and the terminal is performed via a wireless channel, ensuring the convenience of the customer and, in addition, allowing the use of a mobile device as a payment device, the mobile device being capable of software or software and hardware emulation of a bank card.

The disadvantages of the described solutions known from the prior art become apparent when conventional offline and online authentication procedures are applied to contactless payments.

In order to implement the offline authentication procedure, it is necessary that the bank card interacts with the payment terminal for a sufficient enough time for the customer to input the value of the authentication data through the terminal input device, for the terminal to send this value to the customer's device, and for the customer's device to compare it to the reference value, and finally to transmit the comparison result back to the terminal. In the case of payment by the contact method, when the card is inserted into the slot on the terminal, and it stays there during the entire authentication procedure, there are no problems with the offline authentication procedure. However, with contactless payment, the customer's device interacts with the terminal for an extremely short time, which makes it impossible to carry out such an authentication procedure. Thus, online authentication becomes the only possible option in this case.

However, when comparing offline and online authentication, it should be noted that there is a significant advantage of the offline procedure over the online one. With offline authentication, the reference value of the authentication data is stored on the customer's device, and there is no need to store it on any other information nodes of the system. This, in turn, ensures the convenience and safety of changing it if necessary, since the change can be performed locally, for example, in the case of a bank card, it can be performed at an ATM without transmitting any confidential information over the network to the customer's bank server. In addition, the fewer devices store confidential information, and the less is the need to transmit this information between sites, the more reliable the payment system becomes.

Furthermore, enabling the payment system to support both payment procedures requires storing the reference values of authentication data on two nodes of the system: the customer's device and the customer's bank server. Consequently, if it becomes necessary to change the reference value of the authentication data, a synchronization procedure for the two values must take place, which in itself complicates the system and makes it more vulnerable.

On the other hand, the online procedure has an advantage over the offline procedure lying in that a trusted third party, namely, the server of the customer's bank, performs verification of the authentication data, which also reduces the vulnerability of the system.

Thus, the object of the present invention is to provide a method of authenticating a customer, a method of carrying out a payment transaction comprising said authentication method, and a payment system implementing the specified methods, which would allow to achieve a technical effect consisting in expanding the functionality of the payment system and reducing its vulnerability, in particular, by making it possible to conduct a payment transaction in a contactless way, on condition that the reference value of the customer authentication data is stored exclusively on the customer's device, as well as by combining the advantages of online and offline customer authentication procedures.

SUMMARY OF THE INVENTION

According to the present invention, the problem is solved by providing a method of authenticating a customer during a payment transaction, wherein a reference value of a customer authentication data is stored on a customer's payment device, the method comprising: data exchange between a payment terminal and the customer's device, input of a value of the customer authentication data by the customer through a terminal input device and verification of that if the inputted value of the customer authentication data matches the reference one, wherein it comprises data exchange between the payment terminal and the customer's bank server, and during the process of data exchange between the terminal and the customer's device the customer's device generates a session key of the customer's device using a unique key of the customer's device and a variable data that change with each transaction; performs a one-way conversion of the reference value of the customer authentication data; encrypts the converted reference value of the customer authentication data using the session key of the customer's device; transmits to the terminal a customer's device data set comprising the converted reference value of the customer authentication data in an encrypted form, a customer's device identifier and the variable data; during the process of data exchange between the payment terminal and the customer's bank server the terminal performs a one-way conversion of the inputted value of the customer authentication data; transmits to the customer's bank server a terminal data set comprising the converted reference value of the customer authentication data in the encrypted form, the converted inputted value of the customer authentication data, the customer's device identifier and the variable data; the customer's bank server generates the unique key of the customer's device using a master key of the customer's bank server and the customer's device identifier; generates the session key of the customer's device using the unique key of the customer's device and the variable data; encrypts the converted inputted value of the customer authentication data using the session key of the customer's device; verifies that the inputted value of the customer authentication data matches the reference one by comparing the converted inputted value of the customer authentication data with the converted reference value of the customer authentication data in the encrypted form.

The problem of the invention is also solved by providing a method of carrying out a payment transaction comprising said authentication method, and by providing a payment system implementing the specified methods.

The Summary of the Invention is provided to introduce the main concept of the invention in a simplified form that is further described below in the Detailed Description of the Invention. The Summary of the Invention is not intended to identify essential features of the claimed subject matter, nor is it intended to be used to limit the scope of the claimed subject matter.

BRIEF DESCRIPTION OF THE DRAWINGS

Where considered appropriate, reference numerals may be repeated among the figures to indicate similar elements.

DETAILED DESCRIPTION OF THE INVENTION

In order to explain the invention, this description begins with more detailed information about the solution of the aforementioned problem of the prior art.

Figure 1:
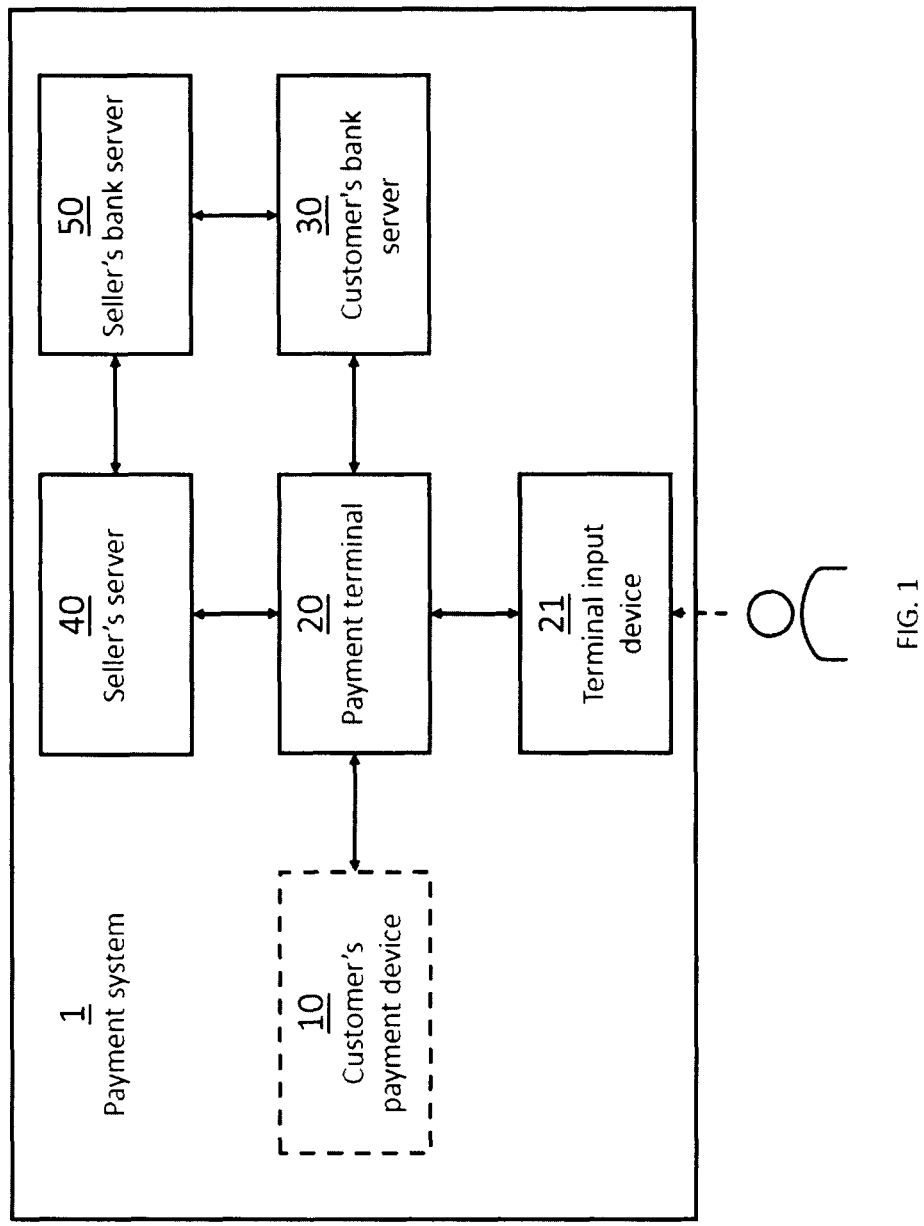
FIG. 1 is a block diagram, depicting an embodiment of a payment system.
Figure 2A:
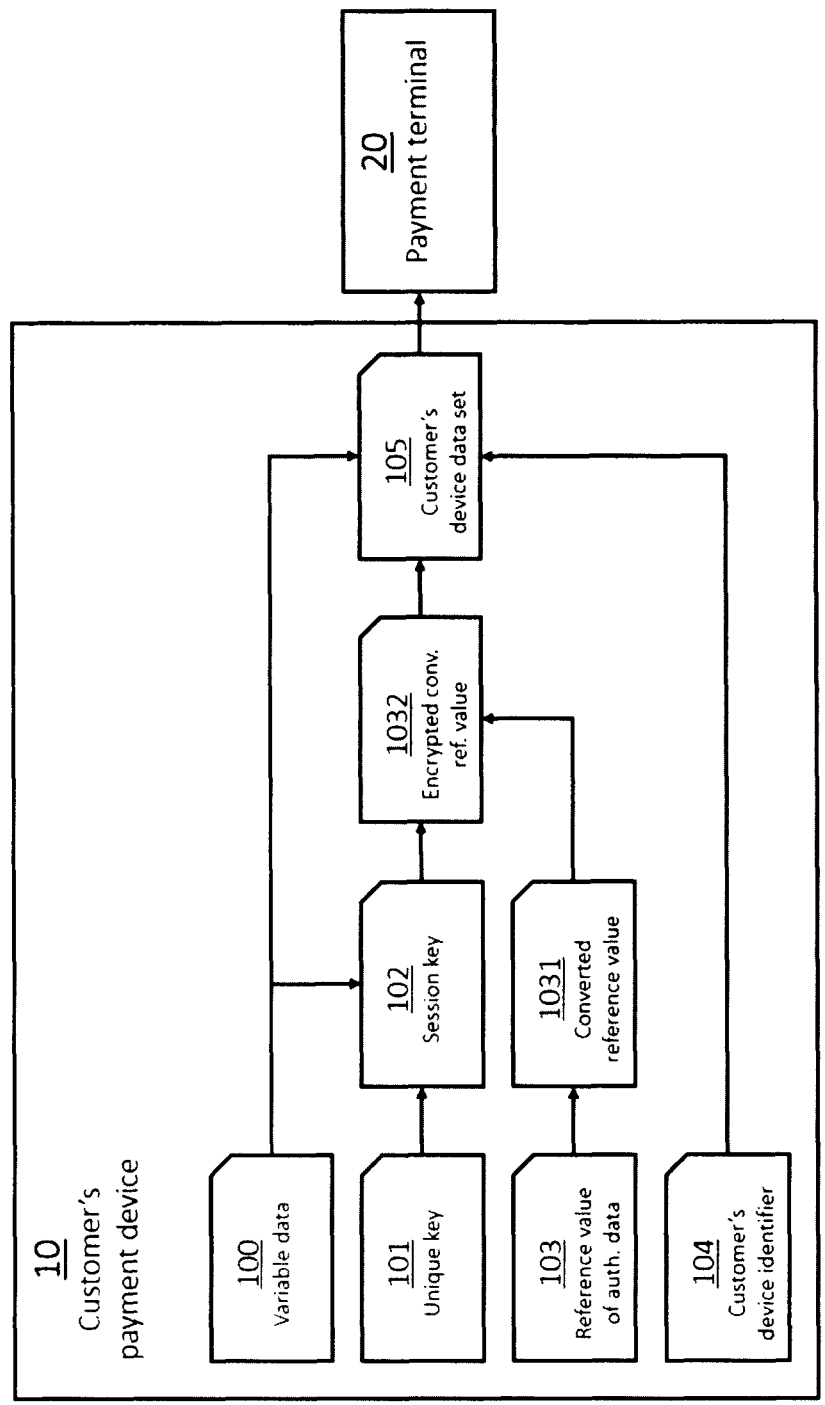
FIG. 2A is a block diagram, depicting an embodiment of a customer's payment device within the payment system.
Figure 2B:
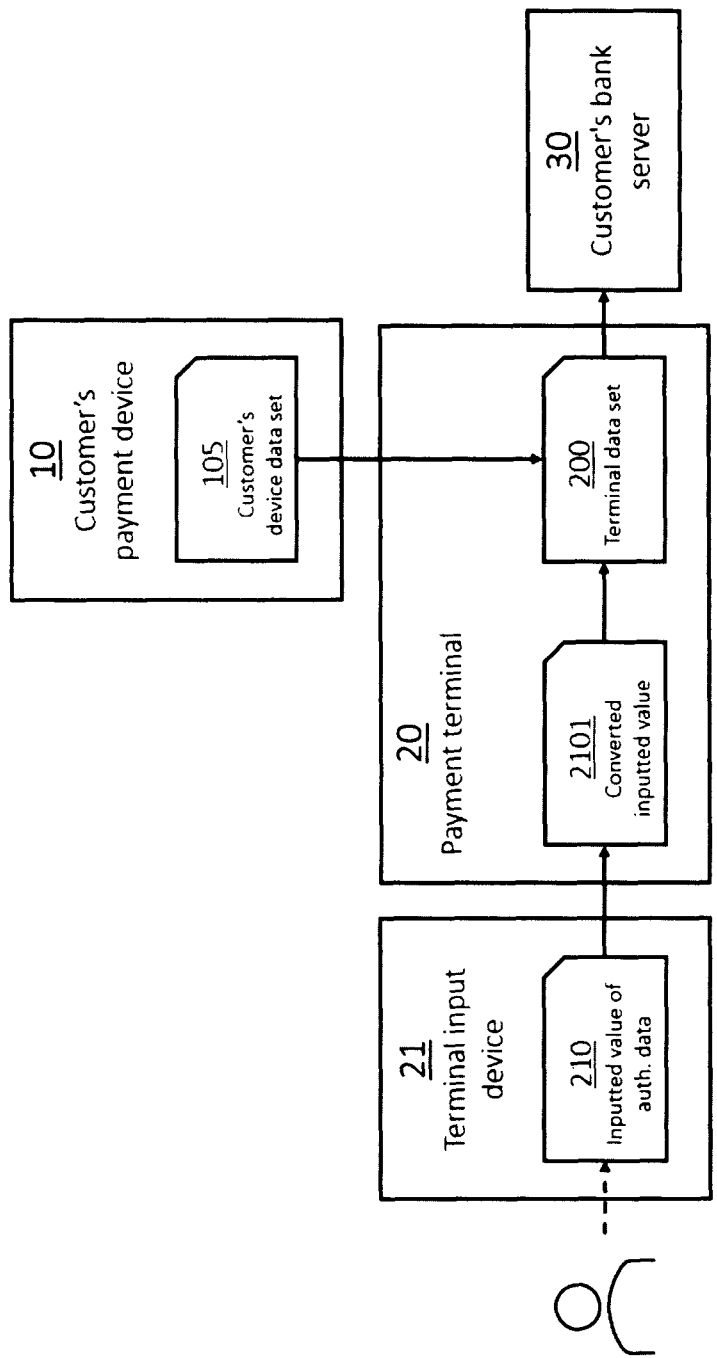
FIG. 2B is a block diagram, depicting an embodiment of a payment terminal within the payment system.
Figure 2C:
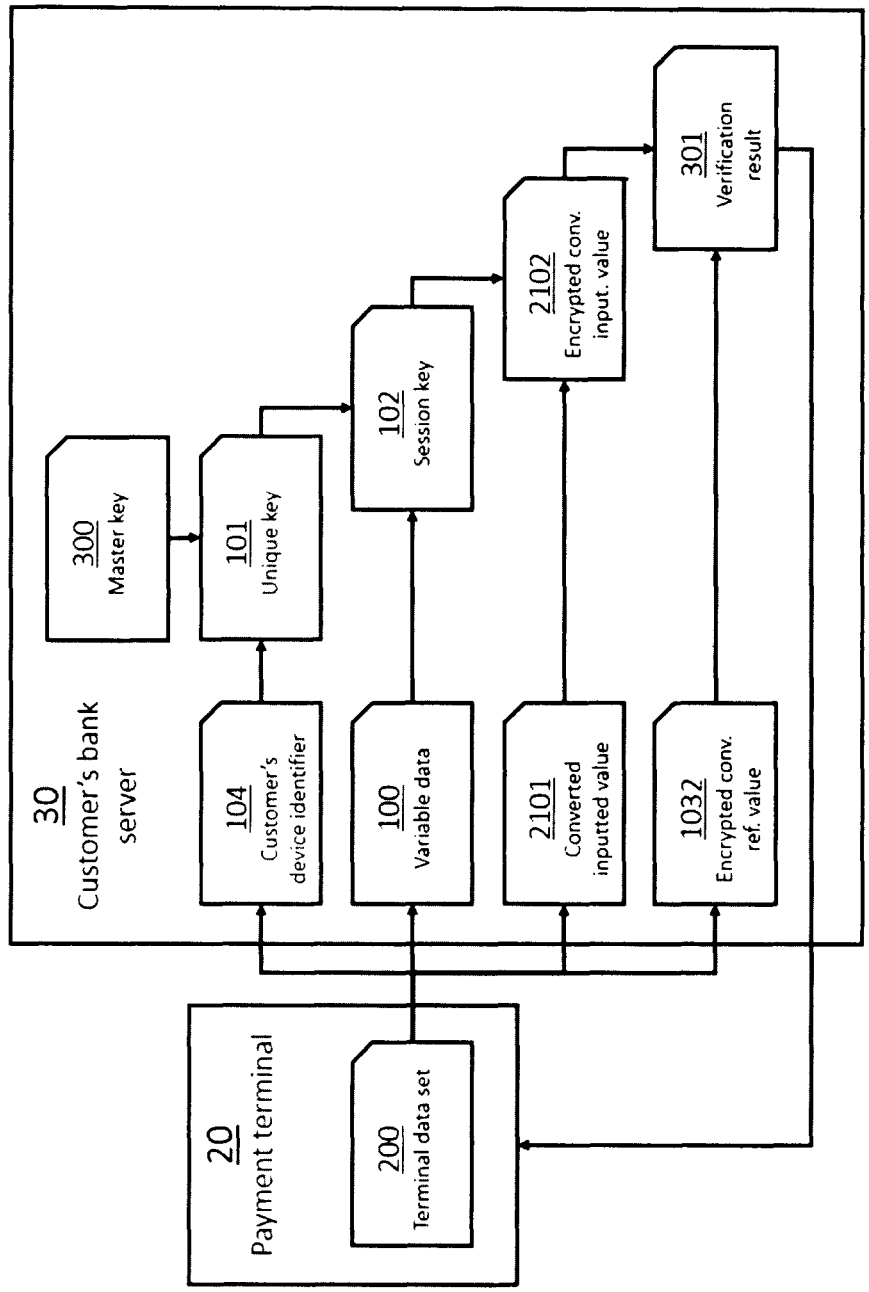
FIG. 2C is a block diagram, depicting an embodiment of a customer's bank server within the payment system.
Figure 3:
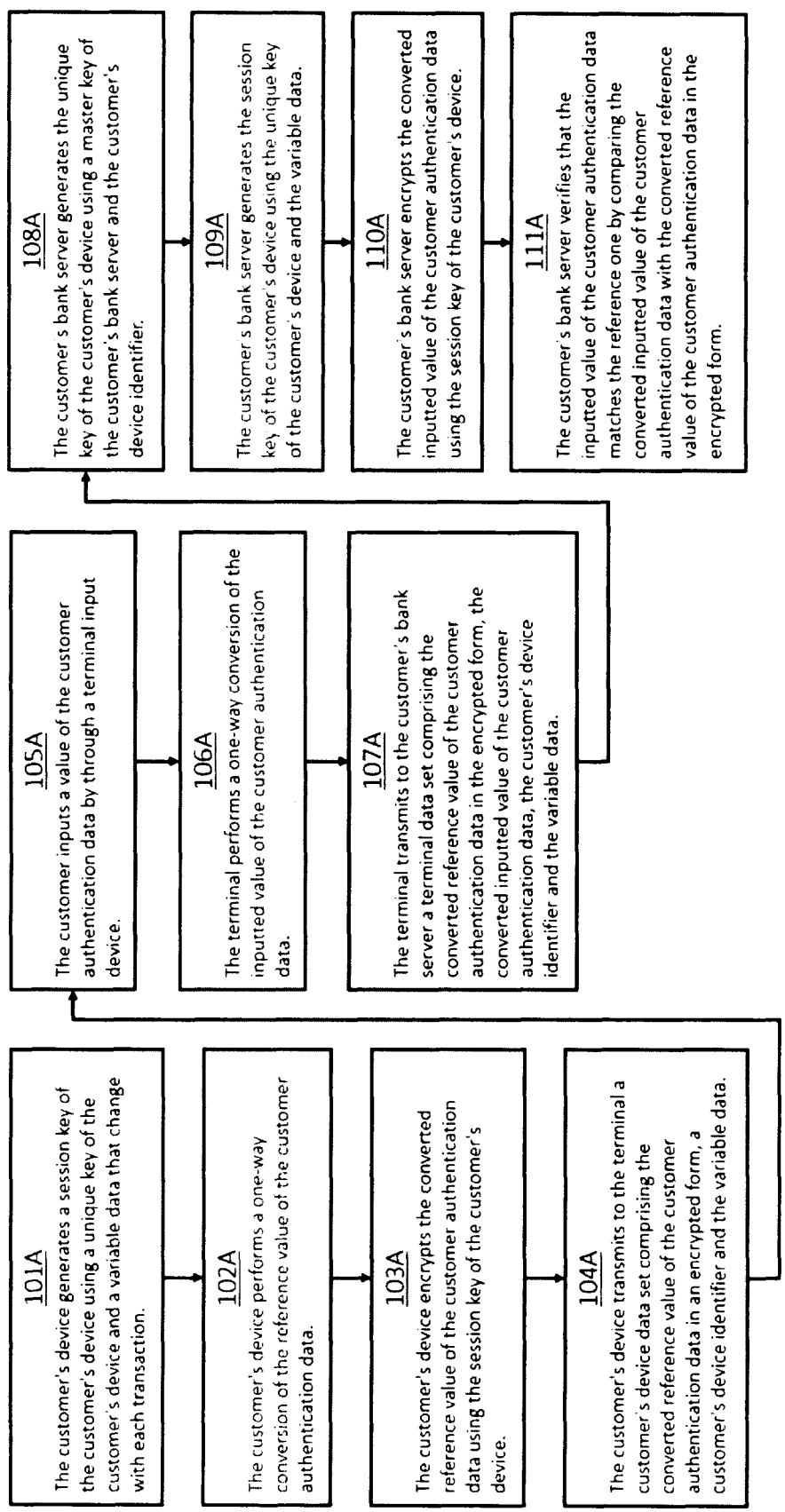
FIG. 3 is a flow diagram, depicting an embodiment of a method of authenticating a customer during a payment transaction.

As it was mentioned above, the problem is solved by providing a method of authenticating a customer during a payment transaction, wherein a reference value of a customer authentication data (e.g., reference value 103 of auth. data, as shown in FIG. 2A) is stored on a customer's payment device (e.g., customer's payment device 10, as shown in FIGS. 1 and 2A), the method comprising: data exchange between a payment terminal (e.g., payment terminal 20, as shown in FIGS. 1 and 2B) and the customer's device (e.g., customer's payment device 10, as shown in FIGS. 1 and 2A), input of a value of the customer authentication data (e.g., inputted value 210 of auth. data, as shown in FIGS. 1 and 2B) by the customer through a terminal input device (e.g., terminal input device 21, as shown in FIGS. 1 and 2B) and verification that the inputted value of the customer authentication data (e.g., inputted value 210 of auth. data, as shown in FIGS. 1 and 2B) matches the reference one (e.g., reference value 103 of auth. data, as shown in FIG. 2A), wherein the method comprises data exchange between the payment terminal and the customer's bank server (e.g., customer's bank server 30, as shown in FIGS. 1 and 2C), and during the process of data exchange between the terminal and the customer's device the customer's device generates a session key (e.g., session key 102, as shown in FIG. 2A) of the customer's device using a unique key (e.g., unique key 101, as shown in FIG. 2A) of the customer's device and a variable data that change with each transaction (e.g., variable data 100, as shown in FIG. 2A) (e.g., step 101A, as shown in FIG. 3); performs a one-way conversion of the reference value of the customer authentication data (e.g., step 102A, as shown in FIG. 3); encrypts the converted reference value of the customer authentication data (e.g., converted reference value 1031, as shown in FIG. 2A) using the session key of the customer's device (e.g., step 103A, as shown in FIG. 3): transmits to the terminal a customer's device data set (e.g., customer's device data set 105, as shown in FIGS. 2A and 2B) comprising the converted reference value of the customer authentication data in an encrypted form (e.g., encrypted converted reference value 1032, as shown in FIG. 2A), a customer's device identifier (e.g., customer's device identifier 104, as shown in FIG. 2A) and the variable data (e.g., step 104A, as shown in FIG. 3): during the process of data exchange between the payment terminal and the customer's bank server the terminal performs a one-way conversion of the inputted value of the customer authentication data (e.g., inputted value 210 of auth. data, as shown in FIGS. 1 and 2B) (e.g., step 106A, as shown in FIG. 3); transmits to the customer's bank server (e.g., customer's bank server 30, as shown in FIGS. 1 and 2C) a terminal data set (e.g., terminal data set 200, as shown in FIGS. 2B and 2C) comprising the converted reference value of the customer authentication data in the encrypted form (e.g., encrypted converted reference value 1032, as shown in FIG. 2A), the converted inputted value of the customer authentication data (e.g., converted inputted value 2101, as shown in FIG. 2B), the customer's device identifier (e.g., customer's device identifier 104, as shown in FIG. 2A) and the variable data (e.g., variable data 100, as shown in FIG. 2A) (e.g., step 107A, as shown in FIG. 3): the customer's bank server (e.g., customer's bank server 30, as shown in FIGS. 1 and 2C) generates the unique key of the customer's device (e.g., unique key 101, as shown in FIGS. 1 and 2C) using a master key of the customer's bank server (e.g., master key 300, as shown in FIG. 2C) and the customer's device identifier (e.g., customer's device identifier 104, as shown in FIGS. 2A and 2C) (e.g., step 108A, as shown in FIG. 3): generates the session key of the customer's device (e.g., session key 102, as shown in FIGS. 2A and 2C) using the unique key of the customer's device (e.g., unique key 101, as shown in FIGS. 1, 2A and 2C) and the variable data (e.g., variable data 100, as shown in FIG. 2A) (e.g., step 109A, as shown in FIG. 3); encrypts the converted inputted value of the customer authentication data (e.g., converted inputted value 2101, as shown in FIGS. 2B and 2C) using the session key of the customer's device (e.g., session key 102, as shown in FIGS. 2A and 2C) (e.g., step 110A, as shown in FIG. 3); verifies that the inputted value of the customer authentication data (e.g., inputted value 210 of auth. data, as shown in FIGS. 1 and 2B) matches the reference one (e.g., reference value 103 of auth. data, as shown in FIG. 2A) by comparing the converted inputted value of the customer authentication data with the converted reference value of the customer authentication data in the encrypted form (e.g., by comparing encrypted converted inputted value 2102 with encrypted converted reference value 1032, as shown in FIGS. 2A and 2C).

Thus, under the conditions of the proposed method of authenticating a customer, the reference value of the customer authentication data (e.g., reference value 103 of auth. data, as shown in FIG. 2A) is stored on the customer's device (e.g., customer's payment device 10, as shown in FIGS. 1 and 2A) exclusively. The comparison of the reference value of the customer authentication data (e.g., reference value of auth. data 103, as shown in FIG. 2A) and the value inputted by the customer (e.g., inputted value of auth. data 210, as shown in FIG. 2B) through the terminal input device (e.g., terminal input device 21, as shown in FIGS. 1 and 2B) is carried out by a trusted third party—the customer's bank server (e.g., customer's bank server 30, as shown in FIGS. 1 and 2C). In this case, neither the reference (e.g., reference value of auth. data 103, as shown in FIG. 2A) nor the inputted values (e.g., inputted value of auth. data 210, as shown in FIG. 2B) are transmitted to the customer's bank server (e.g., customer's bank server 30, as shown in FIGS. 1 and 2C), neither in a clear form, nor in a form assuming decryption with restoration of the original value. On the contrary, the customer's device (e.g., customer's payment device 10, as shown in FIGS. 1 and 2A) performs a one-way conversion (e.g., step 102A, as shown in FIG. 3) of the reference value of customer authentication data (e.g., reference value of auth. data 103, as shown in FIG. 2A), and the terminal (e.g., payment terminal 20, as shown in FIGS. 1 and 2B) performs a one-way conversion of the inputted one (e.g., step 110A, as shown in FIG. 3). It should be understood that a one-way conversion is a conversion using a one-way function, that is, such a conversion that it becomes practically impossible to restore the original value of the authentication data (e.g., reference value of auth. data 103, as shown in FIG. 2A). In addition to the above-mentioned factors the symmetric encryption is used: the customer's device stores its unique key (e.g., unique key 101, as shown in FIG. 2A), with which it encrypts the converted reference value of the customer authentication data (e.g., converted reference value 1031, as shown in FIG. 2A). In this case, a copy of this key is not stored on the customer's bank server (e.g., customer's bank server 30, as shown in FIGS. 1 and 2C), the server generates this key using the master key (e.g., master key 300, as shown in FIG. 2C) of the customer's bank server (e.g., customer's bank server 30, as shown in FIGS. 1 and 2C) and the customer's device identifier (e.g., customer's device identifier 104, as shown in FIG. 2C), after which it encrypts (e.g., step 110A, as shown in FIG. 3) the converted input value of the customer authentication data (e.g., converted inputted value 2101, as shown in FIG. 2C) and compares the two values in encrypted form (e.g., encrypted converted reference value 1032 and encrypted cony. input. value 2102, as shown in FIG. 2C). Thus, only the customer's bank server (e.g., customer's bank server 30, as shown in FIGS. 1 and 2C) can make this comparison, and, therefore, it can act as a trusted party when performing authentication.

With regard to the application of this method to contactless payment, the short time spent by the customer's payment device (e.g., customer's payment device 10, as shown in FIGS. 1 and 2A) in interaction with the payment terminal (e.g., payment terminal 20, as shown in FIGS. 1 and 2B) is sufficient for carrying out the aforementioned data exchange between these devices to the required extent. After that, the customer may be requested to input the value of the authentication data (e.g., inputted value of auth. data 210, as shown in FIG. 2B) through the terminal input device (e.g., terminal input device 21, as shown in FIGS. 1 and 2B). Moreover, at this stage there is already no need to exchange data between the customer's device (e.g., customer's payment device 10, as shown in FIGS. 1 and 2A) and the terminal (e.g., payment terminal 20, as shown in FIGS. 1 and 2B), which makes it possible to use the claimed invention, which is characterized by storing the reference value of the authentication data (e.g., reference value of auth. data 103, as shown in FIG. 2A) exclusively on the customer's device, in contactless payment transactions.

In this case, if the need arises to change the reference value of the authentication data (e.g., reference value of auth. data 103, as shown in FIG. 2A), it can be done in the most secure way, since it does not require the transfer of a new reference value to any information node of the system, but only requires changing the reference value previously stored on the customer's device (e.g., customer's payment device 10, as shown in FIGS. 1 and 2A) to a new one.

In a preferred embodiment of the claimed method of authenticating a customer a one-way cryptographic hash function is used to perform a one-way conversion of the inputted and reference values of the customer authentication data. In this case, it is preferable that the arguments of the hash function comprise the variable data (e.g., variable data 100, as shown in FIGS. 2A/2C).

It is preferable that the variable data comprise a one-time-use terminal code generated by the terminal and transmitted to the customer's device during the process of data exchange between the terminal and the customer's device and/or a value of a transaction counter of the customer's device.

In a preferred embodiment of the claimed method of authenticating a customer, the data exchange between the payment terminal and the customer's device is performed via a wireless data transmission channel. In particular, it is preferable that the wireless data transmission channel is implemented using RFID and NFC technology, which is widely used for realizing so-called contactless payment. However, it should be noted that this authentication method is applicable to other known types of payments, in particular, for those that are carried out by the "contact" method.

In one of the preferred embodiments of the claimed method of authenticating a customer, the primary account number (PAN) is used as the customer's device identifier.

However, the primary account number (PAN) can also be classified as confidential. Therefore, in another preferred embodiment of the claimed method of authenticating a customer, the PAN number is not included in the transmitted information. Instead, some unique, but not confidential information is used, which is, for example, the customer's device identifier, using which the customer's bank server can find the corresponding PAN number in the customer database. Thus, in this preferred embodiment, in the process of data exchange between the payment terminal and the customer's bank server, the customer's bank server finds a primary account number in the customer database using the customer's device identifier and generates the unique key of the customer's device using the master key of the customer's bank server and the primary account number.

It is important to note that any unique data that allows the customer's bank server to identify the customer and/or his payment device can be used as the customer's device identifier. Thus, in one preferred implementation, the customer ID is used as the customer's device identifier.

In one of the preferred embodiments of the claimed method of authenticating a customer, a bank smart card is used as the customer's device.

In another preferred embodiment of the claimed method of authenticating a customer, a mobile device capable of software or software and hardware emulation of a bank card is used as the customer's device.

In one of the preferred embodiments of the claimed method of authenticating a customer, the customer authentication data comprise a numeric and/or alphabetic code, for example, a PIN code, and the terminal input device comprises a keyboard.

In another preferred embodiment of the claimed method of authenticating a customer, the customer authentication data comprise a biometric data, and the terminal input device is configured to record the customer's biometric data. The biometric data can comprise, for example, vector representations of a face, a pattern of a finger or palm print, a drawing of retina, etc.

In addition to the use of symmetric encryption algorithms in the claimed invention, as mentioned above, it is also possible to use asymmetric encryption algorithms, in particular, the so-called "chain of trust" or "chain of certificates." Thus, in a preferred embodiment of the claimed method of authenticating a customer in the process of data exchange between the terminal and the customer's device the customer's device transmits a public key certificate of the customer's bank server to the terminal; the terminal verifies a digital signature of the public key certificate of the customer's bank server using a public key of a certification authority; extracts a public key of the customer's bank server from the public key certificate of the customer's bank server; the customer's device transmits a public key certificate of the customer's device to the terminal; the terminal verifies a digital signature of the public key certificate of the customer's device using the public key of the customer's bank server; extracts a public key of the customer's device from the public key certificate of the customer's device; generates a one-time-use terminal code, transmits the one-time-use terminal code to the customer's device; the customer's device encrypts the one-time-use terminal code using a private key of the customer's device, transmits the one-time-use terminal code in an encrypted form to the terminal; the terminal decrypts the one-time-use terminal code received from the customer's device; compares the decrypted one-time-use terminal code received from the customer's device with the one-time-use terminal code generated by the terminal.

In a preferred embodiment of the claimed method of authenticating a customer, encryption is used using one more session key—the key generated by the terminal. So, in the process of data exchange between the payment terminal and the customer's bank server the terminal generates a session key of the terminal; encrypts the terminal data set using the session key of the terminal; encrypts the session key of the terminal with a public key of the customer's bank server; transmits the session key of the terminal and the terminal data set in an encrypted form to the customer's bank server; the customer's bank server decrypts the session key of the terminal using a private key of the customer's bank server and decrypts the terminal data set using the session key of the terminal.

In addition, it is also possible to use other session keys. In particular, in one of the preferred embodiments of the present invention, in the process of data exchange between the terminal and the customer's device, the customer's device generates an additional session key of the customer's device and transmits it to the terminal, the terminal encrypts the terminal data set using the additional session key of the customer's device; encrypts an additional session key of the customer's device using the public key of the customer's bank server; transmits the additional session key of the customer's device and the terminal data set in an encrypted form to the customer's bank server; the customer's bank server decrypts the additional session key of the customer's device using the private key of the customer's bank server and decrypts the terminal data set using the additional session key of the customer's device. This will improve the security of the transmitted data.

According to another aspect of the present invention a method of carrying out a payment transaction is provided, the method comprising data exchange between a customer's payment device (e.g., customer's payment device 10, as shown in FIGS. 1 and 2A), a payment terminal (e.g., payment terminal 20, as shown in FIGS. 1 and 2B), a seller's server (e.g., seller's server 40, as shown in FIG. 1), a customer's bank server (e.g., customer's bank server 30, as shown in FIGS. 1 and 2C), a seller's bank server (e.g., seller's bank server 50, as shown in FIG. 1), wherein it comprises an authentication of a customer according to the abovementioned claimed method.

It should be noted that there is a possibility of achieving another technical effect, consisting in simplifying and reducing the cost of the payment system. In existing conventional payment systems, a payment terminal is a relatively complex specialized device comprising software and hardware that provide an adequate level of confidential data protection. Consequently, the creation of such a system, which, while maintaining the current level of confidential information protection, is characterized by the possibility of using simplified and less secure payment terminals, would ensure the achievement of the aforementioned additional technical effect—simplifying and reducing the cost of the payment system.

It is clear that the claimed method of authenticating a customer does not impose high demands on the security of confidential information on the side of the payment terminal, especially according to its implementation, in which there is no PAN number transmission.

Concerning this additional technical effect, the following are preferred options for implementing the claimed method of carrying out a payment transaction.

In a preferred embodiment of the claimed method of carrying out a payment transaction in the process of data exchange between the payment terminal and the customer's device, the customer's device transmits to the terminal an Internet address of the customer's bank server, and the data exchange between the payment terminal and the customer's bank server from the terminal side is performed using the Internet address of the customer's bank server received from the customer's device.

In a preferred embodiment of the claimed method of carrying out a payment transaction, in accordance with one of the preferred embodiments of the method of authenticating a customer, in the process of data exchange between the terminal and the customer's device the customer's device transmits a public key certificate of the customer's bank server to the terminal; the terminal verifies a digital signature of the public key certificate of the customer's bank server using a public key of a certification authority; extracts a public key of the customer's bank server from the public key certificate of the customer's bank server; the customer's device transmits a public key certificate of the customer's device to the terminal; the terminal verifies a digital signature of the public key certificate of the customer's device using the public key of the customer's bank server; extracts a public key of the customer's device from the public key certificate of the customer's device; generates a one-time-use terminal code, transmits the one-time-use terminal code to the customer's device; the customer's device encrypts the one-time-use terminal code using a private key of the customer's device, transmits the one-time-use terminal code in an encrypted form to the terminal; the terminal decrypts the one-time-use terminal code received from the customer's device and compares the decrypted one-time-use terminal code received from the customer's device with the one-time-use terminal code generated by the terminal.

It should be clear that the above sequence of steps is not limiting, and it is possible to perform the steps of the method in any other sequence that does not go beyond the scope of the claimed solution.

In a preferred embodiment of the claimed method of carrying out a payment transaction, the terminal also undergoes a kind of authentication. Thus, preferably, in the process of data exchange between the terminal and the customer's device, the terminal transmits a certificate of the terminal to the customer's device; the customer's device verifies a digital signature of the certificate of the terminal using the public key of the certification authority.

In addition, terminal (e.g., payment terminal 20, as shown in FIGS. 1 and 2B) authentication is preferably performed not only by the customer's device (e.g., customer's payment device 10, as shown in FIGS. 1 and 2A), but also by other information nodes. Moreover, in the most preferred embodiment of the claimed method of carrying out a payment transaction, each of the information nodes, including the seller's server (e.g., seller's server 40, as shown in FIG. 1), authenticates in the data exchange process. So, preferably, in the process of data exchange between the payment terminal and the seller's server (e.g., seller's server 40, as shown in FIG. 1) the terminal transmits a certificate of the terminal and the public key certificate of the customer's bank server (e.g., customer's bank server 30, as shown in FIGS. 1 and 2C) to the seller's server (e.g., seller's server 40, as shown in FIG. 1); the seller's server (e.g., seller's server 40, as shown in FIG. 1) verifies a digital signature of the certificate of the terminal using the public key of the certification authority; verifies the digital signature of the public key certificate of the customer's bank server (e.g., customer's bank server 30, as shown in FIGS. 1 and 2C) using the public key of the certification authority; encrypts a seller's payment details using a private key of the seller's server (e.g., seller's server 40, as shown in FIG. 1); transmits the seller's payment details in an encrypted form and a public key certificate of the seller's server (e.g., seller's server 40, as shown in FIG. 1) to the terminal; in the process of data exchange between the payment terminal and the customer's bank server the terminal transmits the seller's payment details in an encrypted form, the public key certificate of the seller's server (e.g., seller's server 40, as shown in FIG. 1) and the certificate of the terminal to the customer's bank server; the customer's bank server verifies a digital signature of the public key certificate of the seller's server (e.g., seller's server 40, as shown in FIG. 1) using the public key of the certification authority; verifies the digital signature of the certificate of the terminal using the public key of the certification authority; extracts a public key of the seller's server (e.g., seller's server 40, as shown in FIG. 1) from the public key certificate of the seller's server (e.g., seller's server 40, as shown in FIG. 1); decrypts the seller's payment details using the public key of the seller's server.

The preferred embodiment of the claimed method of carrying out a payment transaction comprises an authentication of the customer's payment device.

Moreover, in one of the preferred embodiments, the authentication of the customer's payment device is an additional result of the authentication of the customer. It should be understood that the claimed method of authenticating a customer is characterized by its sufficiency not only for authenticating the customer, but also for authenticating his device. This is ensured by the fact that this method comprises not only the use of the customer authentication data, but also the use of the data that, in fact, due to their uniqueness for each of the payment devices can act as device authentication data. So, in view of the fact that the unique key of the customer's device is stored only on the customer's device, and only the customer's bank server has the means to compute this key, the generation of the session key of the customer's device using the unique key of the customer's device and variable data, encryption of the converted inputted value of the customer authentication data using the session key of the customer's device and the subsequent comparison of the converted inputted value of the customer authentication data with the converted reference value of the customer authentication data in the encrypted form, reliably verify not only the information that has been converted and encrypted (that is, the customer authentication data), but also the key that has been used during the encryption. Thus, if two compared values match, this indirectly indicates the correspondence of the values of the customer authentication data and the correspondence of the unique keys of the customer's device, in other words, the correspondence of the values of the customer's device authentication data.

Nevertheless, it is possible to use separate methods for authenticating the customer's device. Thus, in another preferred embodiment of the method of carrying out a payment transaction when authenticating a customer's device, in the process of data exchange between a terminal and a customer's device, the customer's device encrypts the customer's device authentication data using the session key of the customer's device; transmits to the terminal the customer's device authentication data and the customer's device authentication data in an encrypted form; in the process of data exchange between the payment terminal and the customer's bank server, the terminal transmits to the customer's bank server the customer's device authentication data and the customer's device authentication data in the encrypted form; the customer's bank server encrypts the customer's device authentication data using the session key of the customer's device; compares the customer's device authentication data, encrypted on the customer's device, with the customer's device authentication data, encrypted on the customer's bank server, in the encrypted form. In this case, the customer's device authentication data preferably comprise the variable data. Also, the customer's device authentication data preferably comprise the Internet address of the customer's bank server.

According to another aspect of the present invention a payment system (e.g., payment system 1, as shown in FIG. 1) is provided, the system comprising at least one payment terminal (e.g., payment terminal 20, as shown in FIGS. 1 and 2B) configured to exchange data with a customer's payment device (e.g., customer's payment device 10, as shown in FIGS. 1 and 2A), a seller's server (e.g., seller's server 40, as shown in FIG. 1), a customer's bank server (e.g., customer's bank server 30, as shown in FIGS. 1 and 2C), and a seller's bank server (e.g., seller's bank server 50, as shown in FIG. 1) and comprising a terminal input device (e.g., terminal input device 21, as shown in FIGS. 1 and 2B); the seller's server (e.g., seller's server 40, as shown in FIG. 1) configured to exchange data with the payment terminal (e.g., payment terminal 20, as shown in FIGS. 1 and 2B); the customer's payment device (e.g., customer's payment device 10, as shown in FIGS. 1 and 2A) configured to exchange data with the payment terminal (e.g., payment terminal 20, as shown in FIGS. 1 and 2B); the customer's bank server (e.g., customer's bank server 30, as shown in FIGS. 1 and 2C) configured to exchange data with the payment terminal (e.g., payment terminal 20, as shown in FIGS. 1 and 2B); the seller's bank server (e.g., seller's bank server 50, as shown in FIG. 1) configured to exchange data with the payment terminal (e.g., payment terminal 20, as shown in FIGS. 1 and 2B); wherein the customer's device (e.g., customer's payment device 10, as shown in FIGS. 1 and 2A) comprises a reference value of a customer authentication data (e.g., reference value of auth. data 103, as shown in FIG. 2A) stored on a machine-readable medium of the customer's device (e.g., customer's payment device 10, as shown in FIGS. 1 and 2A), wherein it comprises program instructions stored on the machine-readable medium of the customer's payment device (e.g., customer's payment device 10, as shown in FIGS. 1 and 2A), which, when executed by at least one processor of the customer's device (e.g., customer's payment device 10, as shown in FIGS. 1 and 2A), allow to generate (e.g., step 101A, as shown in FIG. 3) a session key (e.g., session key 102, as shown in FIGS. 2A, 2C) of the customer's device using a unique key (e.g., unique key 101, as shown in FIGS. 2A, 2C) of the customer's device and a variable data (e.g., variable data 100, as shown in FIGS. 2A, 2C) that change with each transaction; to perform a one-way conversion (e.g., step 102A, as shown in FIG. 3) of the reference value of the customer authentication data (e.g., reference value of auth. data 103, as shown in FIG. 2A); to encrypt (e.g., step 103A, as shown in FIG. 3) the converted reference value of the customer authentication data (e.g., converted reference value 1031, as shown in FIG. 2A) using the session key (e.g., session key 102, as shown in FIGS. 2A, 2C) of the customer's device; to transmit (e.g., step 104A, as shown in FIG. 3) a customer's device data set (e.g., customer's device data set 105, as shown in FIGS. 2A-2C) comprising the converted reference value of the customer authentication data in an encrypted form (e.g., encrypted converted reference value 1032, as shown in FIGS. 2A, 2C), a customer's device identifier (e.g., customer's device identifier 104, as shown in FIGS. 2A, 2C) and the variable data (e.g., variable data 100, as shown in FIGS. 2A, 2C) to the terminal (e.g., payment terminal 20, as shown in FIGS. 1 and 2B); it comprises program instructions stored on a machine-readable medium of the payment terminal (e.g., payment terminal 20, as shown in FIGS. 1 and 2B), which, when executed by at least one processor of the payment terminal (e.g., payment terminal 20, as shown in FIGS. 1 and 2B), allow to perform a one-way conversion (e.g., step 106A, as shown in FIG. 3) of a value of a customer authentication data inputted by a customer (e.g., inputted value of auth. data 210, as shown in FIG. 2B) through the terminal input device (e.g., terminal input device 21, as shown in FIGS. 1 and 2B); to transmit (e.g., step 107A, as shown in FIG. 3) a terminal data set (e.g., terminal data set 200, as shown in FIGS. 2B, 2C) comprising the converted reference value of the customer authentication data in the encrypted form (e.g., encrypted converted reference value 1032, as shown in FIGS. 2A, 2C), the converted inputted value of the customer authentication data (e.g., converted inputted value 2101, as shown in FIGS. 2B, 2C), the customer's device identifier (e.g., customer's device identifier 104, as shown in FIGS. 2A, 2C) and the variable data (e.g., variable data 100, as shown in FIGS. 2A, 2C) to the customer's bank server (e.g., customer's bank server 30, as shown in FIGS. 1 and 2C); it comprises program instructions stored on the computer-readable medium of the customer's bank server (e.g., customer's bank server 30, as shown in FIGS. 1 and 2C), which, when executed by at least one processor of the customer's bank server (e.g., customer's bank server 30, as shown in FIGS. 1 and 2C) allow to generate (e.g., step 108A, as shown in FIG. 3) the unique key (e.g., unique key 101, as shown in FIGS. 2A, 2C) of the customer's device (e.g., customer's payment device 10, as shown in FIGS. 1 and 2A) using a master key (e.g., master key 300, as shown in FIG. 2C) of the customer's bank server (e.g., customer's bank server 30, as shown in FIGS. 1 and 2C) and the customer's device identifier (e.g., customer's device identifier 104, as shown in FIGS. 2A, 2C); to generate (e.g., step 109A, as shown in FIG. 3) the session key (e.g., session key 102, as shown in FIGS. 2A, 2C) of the customer's device (e.g., customer's payment device 10, as shown in FIGS. 1 and 2A) using the unique key (e.g., unique key 101, as shown in FIGS. 2A, 2C) of the customer's device and the variable data (e.g., variable data 100, as shown in FIGS. 2A, 2C); to encrypt (e.g., step 110A, as shown in FIG. 3) the converted inputted value of the customer authentication data (e.g., converted inputted value 2101, as shown in FIGS. 2B, 2C) using the session key (e.g., session key 102, as shown in FIGS. 2A, 2C) of the customer's device; to compare (e.g., step 111A, as shown in FIG. 3) the converted inputted value of the customer authentication data with the converted reference value of the customer authentication data in the encrypted form (e.g., encrypted converted reference value 1032 and encrypted cony. input. value 2102, as shown in FIGS. 2A, 2C) (e.g., provide verification result 301, as shown in FIG. 2C).

It is clear that the result of the payment transaction is the implementation of mutual settlements between the customer's bank and the seller's bank. In this case, the transfer of funds from the customer's account to the seller's account can preferably be carried out by one of the following known methods. The first one is "funds transfer", wherein the bank of the customer initiates the transfer of the customer's funds to the bank account of the seller. The second method, traditionally used in transactions with bank cards, is a transfer of funds upon request ("transaction authorization"), which is sent by the seller's bank server to the customer's bank server. After receiving such a request, the customer's bank server checks the availability of funds in the customer's account and transfers the required amount as payment for the purchase to the seller's account. Other names for these methods are "push" and "pull" payments, respectively.

These preferred embodiments of the claimed methods and the system for their implementation according to the present invention are given as an example and do not limit the scope of the claims in this application, while the claimed objects can be implemented in any other way characterized by the claimed set of essential features.

The claimed solution is implemented as follows.

At the initial preparatory stage, the keys are exchanged between the sites and the corresponding certificates are signed. The customer's bank server, the terminal and the seller's server generate private/public key pairs and transmit their public keys to the certification authority to be signed. The certification authority signs the public keys of the customer's bank server, the terminal and the seller's server with its private key, thus creating certificates of the corresponding keys, and sends the certificates and public keys of the certification authority back to the customer's bank server, the terminal and the seller's server.

At the next stage, the so-called "personalization" of the customer's device (bank card or mobile device, capable of software or software and hardware emulation of a bank card) occurs. The customer's bank server generates a private/public key pair for each customer's device and signs the public key of the customer's device with the private key of the customer's bank server, and thus creates a public key certificate of the customer's device.

Further, the customer's bank server transmits to the customer's device the following: the public key of the certification authority, the public key certificate of the customer's bank server, and the public key certificate of the customer's device. Additionally, the bank can transmit additional data onto the customer's device or include such additional data in the certificate to improve security.

Further, at the stage of making purchases, the customer can search and select products from the terminal on the seller's server. After this process, the customer makes his choice and confirms the purchase and its amount, after which these data are displayed on the terminal for further payment. Alternatively, the selection of a product can be made without a terminal, whereby the seller's store employee can scan the barcodes of the products, and a list of products and amounts for payment will be displayed on the terminal screen for further payment.

The next stage is already directly related to the implementation of a payment transaction. The customer applies the customer's contactless payment device to the terminal's contactless reader. In the process of data exchange between the terminal and the customer's device, the customer's device transmits the public key certificate of the customer's bank server to the terminal, the terminal verifies the digital signature of the public key certificate of the customer's bank server using the public key of the certification authority; extracts the public key of the customer's bank server from the public key certificate of the customer's bank server; the customer's device transmits the public key certificate of the customer's device to the terminal; the terminal verifies the digital signature of the public key certificate of the customer's device using the public key of the customer's bank server; extracts the public key of the customer's device from the customer's device public key certificate; generates a one-time-use terminal code, transmits the one-time-use terminal code to the customer's device, the customer's device encrypts the one-time-use terminal code, using the private key of the customer's device, transmits the one-time-use terminal code in an encrypted form to the terminal; the terminal decrypts the one-time-use terminal code received from the customer's device; compares the decrypted one-time-use terminal code received from the customer's device with the one-time-use terminal code generated by the terminal. In addition, the terminal transmits the terminal certificate to the customer's device; the customer's device verifies the digital signature of the terminal certificate using the public key of the certification authority. Also, the customer's device generates a session key of the customer's device using the unique key of the customer's device and a variable data that changes with each transaction; performs a one-way conversion of the reference value of the customer authentication data; encrypts the converted reference value of the customer authentication data using the session key of the customer's device; sends to the terminal a customer's device data set, comprising the converted reference value of the customer authentication data in an encrypted form, the customer's device identifier and the variable data. The variable data comprises a one-time-use terminal code, generated by the terminal and transmitted to the customer's device during data exchange between the terminal and the customer's device, and also comprises the value of the transaction counter of the customer's device. In this case, the customer authentication data comprises a numeric and/or alphabetic code (for example, a PIN code), and the terminal's input device comprises a keyboard.

In the next step, the customer is asked to input a value of the authentication data value (PIN) through a terminal input device (the keyboard). Further, the terminal performs a one-way conversion of the inputted value of the customer authentication data.

Next, the terminal sends a request to the seller's server to confirm the operation. The seller's server verifies the certificate of the terminal and the certificate of the customer's bank server using the public key of the certification authority.

If the verification of the bank and terminal certificates is successful, then the seller's server adds to the payment transaction data received from the terminal, the seller's data required for payment, signs them with the private key of the seller's server and transmits them back to the terminal. This also improves the security of the transaction.

In addition to the payment data, the seller's server transmits a session public key so that using this key the customer's bank server can encrypt data, which the bank will transmit to the seller's server in a response message if necessary.

The terminal transmits the terminal data set comprising the converted reference value of the customer authentication data in an encrypted form, the converted inputted value of the customer authentication data, the customer's device identifier and the variable data to the customer's bank server. In addition, the terminal transmits the data set received from the seller's server to the customer's bank server. In this case, the Internet address of the customer's bank server is received by the terminal directly from the customer's device in the process of data exchange with it. To establish a secure HTTPS Internet session with the customer's bank server the terminal also uses the previously received public key certificate of the customer's bank server. In this case, the terminal connects directly to the Internet server of the customer's bank server, and not to its processing system, therefore confidential data, such as the PAN, are not transmitted in the message, instead, the terminal uses the previously obtained customer's device identifier. Alternatively, the identifier of the account in the Internet banking system of the customer's bank can be used as the customer's device identifier.

The customer's bank server verifies the terminal and the seller's certificates using the public key of the certification authority. The bank then verifies that the customer's device identifier exists in the customer database and that the customer is legitimate.

Further, the customer's bank server generates a unique key of the customer's device using the master key of the customer's bank server and the customer's device identifier; generates the session key of the customer's device using the unique key of the customer's device and the variable data; encrypts the converted inputted value of the customer authentication data using the session key of the customer's device; verifies that the inputted value of the customer authentication data corresponds to the reference value by comparing the converted inputted value of the customer authentication data with the converted reference value of the customer authentication data in the encrypted form. In addition to authenticating the customer, authentication of the customer's device is also indirectly carried out, as described above.

If all checks are successful, then the customer's bank server authorizes the payment transaction in favour of the seller's bank.

The customer's bank receives the data of the seller's bank account, the transaction amount and other data necessary for the payment from the seller's server through the terminal, signed with the public key certificate of the seller's server, thus, these data are trustworthy, and the bank can start the process of transferring funds. There are two generally accepted ways to carry out such operations.

According to the first method, the customer's bank server can confirm (authorize) the transaction by responding positively to the terminal's request, after which the terminal will send the confirmation back to the seller's server along with the PAN number of the customer's device, which the customer's bank sends in a message to the seller's server, encrypted by the session public key of the seller's server, so this message can only be decrypted and read by the seller's server using its private key, which will also improve the whole system security. After receiving the PAN of the customer's device and decrypting it, the seller's server ensures that the bank has authorized the operation and can therefore transmit the PAN of the customer's device to the seller's bank server to make mutual settlements with the customer's bank.

According to the second method, the customer's bank, confirming (authorizing) the transaction and having the data of the seller and the seller's bank, transfers funds to the seller's account through one of the national or international money transfer systems.

Thus, the present invention is the method of authenticating a customer, the method of carrying out a payment transaction comprising said authentication method, and the payment system implementing the specified methods, which ensure the achievement of a technical effect consisting in expanding the functionality of the payment system and reducing its vulnerability, in particular, by making it possible to conduct a payment transaction in a contactless way, on condition that the reference value of the customer authentication data is stored exclusively on the customer's device, as well as by combining the advantages of online and offline customer authentication procedures.

It should be understood that the claimed method of authenticating a customer, a method of carrying out a payment transaction, and a payment system implementing said methods as defined in the appended claims are not necessarily limited to the specific features and embodiments described above. On the contrary, the specific features and embodiments described above are disclosed as examples embodying the claims, and other equivalent features may be encompassed by the claims of the present invention.

The invention claimed is:

1. A method of authenticating a customer during a payment transaction, wherein a reference value of a customer authentication data is stored on a customer's payment device, the method comprising:
exchanging data between a payment terminal and the customer's device,
inputting a value of the customer authentication data by the customer through a terminal input device, and
verifying that the inputted value of the customer authentication data matches the reference one,
characterized in that the method comprises
exchanging data between the payment terminal and the customer's bank server,
wherein during the process of data exchange between the terminal and the customer's device
the customer's device
generates a session key of the customer's device using a unique key of the customer's device and a variable data that change with each transaction;
performs a one-way conversion of the reference value of the customer authentication data;
encrypts the converted reference value of the customer authentication data using the session key of the customer's device;
transmits to the terminal a customer's device data set comprising the converted reference value of the customer authentication data in an encrypted form, a customer's device identifier and the variable data;
during the process of data exchange between the payment terminal and the customer's bank server
the terminal
performs a one-way conversion of the inputted value of the customer authentication data;
transmits to the customer's bank server a terminal data set comprising the converted reference value of the customer authentication data in the encrypted form, the converted inputted value of the customer authentication data, the customer's device identifier, and the variable data;

the customer's bank server generates the unique key of the customer's device using a master key of the customer's bank server and the customer's device identifier;

generates the session key of the customer's device using the unique key of the customer's device and the variable data;

encrypts the converted inputted value of the customer authentication data using the session key of the customer's device;

verifies that the inputted value of the customer authentication data matches the reference one by comparing the converted inputted value of the customer authentication data with the converted reference value of the customer authentication data in the encrypted form.

2. The method according to claim 1, characterized in that a one-way cryptographic hash function is used to perform a one-way conversion of the inputted and reference values of the customer authentication data.

3. The method according to claim 2, characterized in that the arguments of the hash function comprise the variable data.

4. The method according to claim 1, characterized in that the variable data comprise a one-time-use terminal code generated by the terminal and transmitted to the customer's device during the process of data exchange between the terminal and the customer's device.

5. The method according to claim 1, characterized in that the variable data comprise a value of a transaction counter of the customer's device.

6. The method according to claim 1, characterized in that the data exchange between the payment terminal and the customer's device is performed via a wireless data transmission channel.

7. The method according to claim 6, characterized in that the wireless data transmission channel is implemented using NFC technology.

8. The method according to claim 1, characterized in that a primary account number is used as the customer's device identifier.

9. The method according to claim 1, characterized in that in the process of data exchange between the payment terminal and the customer's bank server, the customer's bank server finds a primary account number in the customer database using the customer's device identifier;

generates the unique key of the customer's device using the master key of the customer's bank server and the primary account number.

10. The method according to claim 1, characterized in that a bank smart card is used as the customer's device.

11. The method according to claim 1, characterized in that a mobile device capable of software or software and hardware emulation of a bank card is used as the customer's device.

12. The method according to claim 1, characterized in that the customer authentication data comprise a numeric and/or alphabetic code, and the terminal input device comprises a keyboard.

13. The method according to claim 1, characterized in that the customer authentication data comprise a biometric data, and the terminal input device is configured to record the customer's biometric data.

14. The method according to claim 1, characterized in that in the process of data exchange between the payment terminal and the customer's bank server the terminal generates a session key of the terminal;

encrypts the terminal data set using the session key of the terminal;

encrypts the session key of the terminal with a public key of the customer's bank server;

transmits the session key of the terminal and the terminal data set in an encrypted form to the customer's bank server;

the customer's bank server decrypts the session key of the terminal using a private key of the customer's bank server;

decrypts the terminal data set using the session key of the terminal.

15. The method according to claim 1, characterized in that in the process of data exchange between the terminal and the customer's device the customer's device transmits a public key certificate of the customer's bank server to the terminal;

the terminal verifies a digital signature of the public key certificate of the customer's bank server using a public key of a certification authority;

extracts a public key of the customer's bank server from the public key certificate of the customer's bank server;

the customer's device transmits a public key certificate of the customer's device to the terminal;

the terminal verifies a digital signature of the public key certificate of the customer's device using the public key of the customer's bank server;

extracts a public key of the customer's device from the public key certificate of the customer's device;

generates a one-time-use terminal code, transmits the one-time-use terminal code to the customer's device;

the customer's device encrypts the one-time-use terminal code using a private key of the customer's device, transmits the one-time-use terminal code in an encrypted form to the terminal;

the terminal decrypts the one-time-use terminal code received from the customer's device;

compares the decrypted one-time-use terminal code received from the customer's device with the one-time-use terminal code generated by the terminal.

16. A method of carrying out the payment transaction, comprising data exchange between the customer's payment device, the payment terminal, a seller's server, the customer's bank server, a seller's bank server, characterized in that the method comprises the authentication of the customer according to the method of claim 1.

17. The method according to claim 16, characterized in that
in the process of data exchange between the payment terminal and the customer's device
the customer's device
transmits to the terminal an Internet address of the customer's bank server,
the data exchange between the payment terminal and the customer's bank server from the terminal side is performed using the Internet address of the customer's bank server received from the customer's device.

18. The method according to claim 16, characterized in that
in the process of data exchange between the terminal and the customer's device
the customer's device
transmits a public key certificate of the customer's bank server to the terminal;
the terminal
verifies a digital signature of the public key certificate of the customer's bank server using a public key of a certification authority;
extracts a public key of the customer's bank server from the public key certificate of the customer's bank server;
the customer's device
transmits a public key certificate of the customer's device to the terminal;
the terminal
verifies a digital signature of the public key certificate of the customer's device using the public key of the customer's bank server;
extracts a public key of the customer's device from the public key certificate of the customer's device;
generates a one-time-use terminal code,
transmits the one-time-use terminal code to the customer's device;
the customer's device
encrypts the one-time-use terminal code using a private key of the customer's device,
transmits the one-time-use terminal code in an encrypted form to the terminal;
the terminal
decrypts the one-time-use terminal code received from the customer's device;
compares the decrypted one-time-use terminal code received from the customer's device with the one-time-use terminal code generated by the terminal.

19. The method according to claim 18, characterized in that
in the process of data exchange between the terminal and the customer's device
the terminal
transmits a certificate of the terminal to the customer's device;
the customer's device
verifies a digital signature of the certificate of the terminal using the public key of the certification authority.

20. The method according to claim 18, characterized in that
in the process of data exchange between the payment terminal and the seller's server
the terminal
transmits a certificate of the terminal and the public key certificate of the customer's bank server to the seller's server;
the seller's server
verifies a digital signature of the certificate of the terminal using the public key of the certification authority;
verifies the digital signature of the public key certificate of the customer's bank server using the public key of the certification authority;
encrypts a seller's payment details using a private key of the seller's server;
transmits the seller's payment details in an encrypted form and a public key certificate of the seller's server to the terminal;
in the process of data exchange between the payment terminal and the customer's bank server
the terminal
transmits the seller's payment details in an encrypted form, the public key certificate of the seller's server and the certificate of the terminal to the customer's bank server;
the customer's bank server
verifies a digital signature of the public key certificate of the seller's server using the public key of the certification authority;
verifies the digital signature of the certificate of the terminal using the public key of the certification authority;
extracts a public key of the seller's server from the public key certificate of the seller's server;
decrypts the seller's payment details using the public key of the seller's server.

21. The method according to claim 16, characterized in that it comprises an authentication of the customer's payment device.

22. The method according to claim 21, characterized in that the authentication of the customer's payment device is an additional result of the authentication of the customer.

23. The method according to claim 21, characterized in that when authenticating the customer's device
in the process of data exchange between the terminal and the customer's device
the customer's device
encrypts a customer's device authentication data using the session key of the customer's device;
transmits the customer's device authentication data and the customer's device authentication data in an encrypted form to the terminal;
in the process of data exchange between the payment terminal and the customer's bank server
the terminal
transmits the customer's device authentication data and the customer's device authentication data in an encrypted form to the customer's bank server;
the customer's bank server
encrypts the customer's device authentication data using the session key of the customer's device;
compares the customer's device authentication data, encrypted on the customer's device, with the customer's device authentication data, encrypted on the customer's bank server, in the encrypted form.

24. The method according to claim 23, characterized in that the customer's device authentication data comprise the variable data.

25. The method according to claim 23, characterized in that the customer's device authentication data comprise an Internet address of the customer's bank's server.

26. A payment system comprising
- at least one payment terminal configured to exchange data with a customer's payment device, a seller's server, a customer's bank server, and a seller's bank server and comprising a terminal input device;
- the seller's server configured to exchange data with the payment terminal;
- the customer's payment device configured to exchange data with the payment terminal;
- the customer's bank server configured to exchange data with the payment terminal;
- the seller's bank server configured to exchange data with the payment terminal;
- wherein the customer's device comprises a reference value of a customer authentication data stored on a machine-readable medium of the customer's device, characterized in that it comprises program instructions stored on the machine-readable medium of the customer's payment device, which, when executed by at least one processor of the customer's device, allow
- to generate a session key of the customer's device using a unique key of the customer's device and a variable data that change with each transaction;
- to perform a one-way conversion of the reference value of the customer authentication data;
- to encrypt the converted reference value of the customer authentication data using the session key of the customer's device;
- to transmit a customer's device data set comprising the converted reference value of the customer authentication data in an encrypted form, a customer's device identifier and the variable data to the terminal;

it comprises program instructions stored on a machine-readable medium of the payment terminal, which, when executed by at least one processor of the payment terminal, allow
- to perform a one-way conversion of a value of a customer authentication data inputted by a customer through the terminal input device;
- to transmit a terminal data set comprising the converted reference value of the customer authentication data in the encrypted form, the converted inputted value of the customer authentication data, the customer's device identifier and the variable data to the customer's bank server;

it comprises program instructions stored on the computer-readable medium of the customer's bank server, which, when executed by at least one processor of the customer's bank server allow
- to generate the unique key of the customer's device using a master key of the customer's bank server and the customer's device identifier;
- to generate the session key of the customer's device using the unique key of the customer's device and the variable data;
- to encrypt the converted inputted value of the customer authentication data using the session key of the customer's device;

to compare the converted inputted value of the customer authentication data with the converted reference value of the customer authentication data in the encrypted form, to verify that the inputted value of the customer authentication data matches the reference one, thereby authenticating the customer.

* * * * *